(12) United States Patent
Rothschild

(10) Patent No.: US 8,908,718 B2
(45) Date of Patent: Dec. 9, 2014

(54) SYSTEMS AND METHODS FOR IMPROVING PERFORMANCE IN AN HFC ARCHITECTURE

(75) Inventor: Keith Alan Rothschild, Dunwoody, GA (US)

(73) Assignee: Cox Communications, Inc., Atlanta, GA (US)

( * ) Notice: Subject to any disclaimer, the term of this patent is extended or adjusted under 35 U.S.C. 154(b) by 458 days.

(21) Appl. No.: 13/276,905

(22) Filed: Oct. 19, 2011

(65) Prior Publication Data

US 2012/0093157 A1    Apr. 19, 2012

Related U.S. Application Data

(60) Provisional application No. 61/394,404, filed on Oct. 19, 2010.

(51) Int. Cl.
*H04J 1/00* (2006.01)
*H04L 27/34* (2006.01)
*H04L 29/06* (2006.01)

(52) U.S. Cl.
CPC .............. *H04L 27/34* (2013.01); *H04L 65/602* (2013.01)
USPC ......................................... 370/484; 370/343

(58) Field of Classification Search
CPC . H04L 65/601; H04L 65/602; H04L 27/2071; H04L 29/06482; H04L 29/06483; H04L 2012/5604; H04L 2012/5605; H04L 2012/6421
USPC ........................ 370/343, 360, 484; 455/183.1
See application file for complete search history.

(56) References Cited

U.S. PATENT DOCUMENTS

| | | | | |
|---|---|---|---|---|
| 5,412,352 | A * | 5/1995 | Graham ......................... | 332/103 |
| 8,558,631 | B1 * | 10/2013 | Harrington et al. ............ | 332/103 |
| 2008/0084939 | A1 * | 4/2008 | Locke ............................ | 375/260 |
| 2009/0232050 | A1 * | 9/2009 | Shen et al. ..................... | 370/328 |
| 2009/0238065 | A1 * | 9/2009 | Dapper et al. ................. | 370/208 |
| 2010/0027425 | A1 * | 2/2010 | Cheung et al. ................ | 370/238 |

* cited by examiner

*Primary Examiner* — Dang Ton
*Assistant Examiner* — Ryan Kavleski
(74) *Attorney, Agent, or Firm* — Sutherland Asbill & Brennan LLP

(57) ABSTRACT

Systems and methods for improving performance in an HFC architecture are provided. Incoming data associated with a plurality of signals to be included in a downstream data signal may be received, and the incoming data may be mapped to a plurality of symbols representative of the signals. Data bits for each symbol may be mapped to at least one data register. The contents of the at least one register may be read by one or more digital-to-analog converters to facilitate a direct radio frequency synthesis, and the output of the one or more digital-to-analog converters may be provided to one or more electro-optic conversion devices configured to output a downstream data signal.

17 Claims, 9 Drawing Sheets

SYSTEMS AND METHODS FOR IMPROVING PERFORMANCE IN AN HFC ARCHITECTURE

CROSS-REFERENCE TO RELATED APPLICATION

This application claims benefit of U.S. Provisional Application No. 61/394,404, filed Oct. 19, 2010, and entitled "Systems and Methods for Improving Performance in an HFC Architecture," the disclosure of which is incorporated by reference herein in its entirety.

FIELD OF THE INVENTION

Aspects of the invention relate generally to broadband communication systems, and more particularly, to signal processing within hybrid fiber coaxial ("HFC") broadband communication systems.

BACKGROUND OF THE INVENTION

Broadband service providers, such as cable service providers, provide a wide variety of services to any number of customers or households. Examples of services that are provided include television services, video on-demand services, telephone services, and Internet services. Certain service providers, such as cable service providers, typically utilize an infrastructure of fiber optic and radio frequency ("RF") cables (i.e., coaxial cables) in order to communicate broadband signals to various customer or consumer devices, such as broadband set-top boxes and broadband modems.

In conventional hybrid fiber coaxial ("HFC") systems, a system associated with a service provider typically receives digital content from a plurality of content providers. The service provider system converts the received content into analog radio frequency ("RF") data, and multiple RF data carriers are combined together utilizing a relatively complex RF combining network. The combined RF signal is then sampled and converted into a format that can be output by the service provider system, such as a format that can be output by an optical transmitter or laser. The operations performed by conventional systems often introduce unwanted noise into the data output by the service provider. For example, noise is added by the process of combining RF signals. Additionally, noise may also be added as a result of sampling signals to recreate a received signal. Moreover, conventional systems typically consume additional power to facilitate the conversion of received data into RF data and the combination of RF data.

Therefore, improved HFC architectures are desirable. Additionally, improved systems, methods, apparatus, and devices that facilitate signal processing within an HFC architecture are desirable.

BRIEF DESCRIPTION OF THE INVENTION

Some or all of the above needs and/or problems may be addressed by certain embodiments of the invention. Embodiments of the invention may include systems and methods for processing content as a service provider head end system. In one embodiment, a method for processing content may be provided. Incoming data associated with a plurality of signals to be output by the service provider head end system may be received. The incoming data may be mapped to a plurality of symbols, and each symbol may include a plurality of data bits that represent an in-phase portion and/or a quadrature phase portion of a respective signal included in the plurality of signals. The respective plurality of data bits for each symbol may be mapped to at least one data register. The contents of the at least one register may be provided to one or more digital-to-analog converters to facilitate a direct radio frequency synthesis, and the output of the one or more digital-to-analog converters may be provided to one or more electro-optic conversion devices configured to output a downstream data signal. In certain embodiments, the operations may be performed by one or more computing devices associated with the service provider head end system.

In another embodiment, a service provider system may be provided. The system may include at least one interface component, at least one signal processing component, at least one register, one or more digital-to-analog converters, and at least one electro-optic conversion component. The at least one interface component may be configured to receive incoming data associated with a plurality of signals to be included in a downstream data signal. The at least one signal processing component may be configured to map the respective data for each of the plurality of signals to one or more symbols for the respective signal. The at least one register may be configured to store the mapped data. The one or more digital-to-analog converters may be configured to read the mapped data from the at least one register and perform a direct radio frequency synthesis on the mapped data. The at least one electro-optic conversion component may be configured to receive the output of the one or more digital-to-analog converters and perform an electro-optic conversion on the output to generate the downstream data signal.

In yet another embodiment, a method for processing content at a service provider head end system may be provided. Incoming data may be received, and the incoming data may be associated with a plurality of signals to be included in a downstream data signal output by a service provider. The respective data for each of the plurality of signals may be mapped to one or more respective symbols. A direct radio frequency synthesis may be performed on the mapped data, and an electro-optic conversion may be performed on the synthesized data to generate the downstream data signal. In certain operations, the above operations may be performed by one or more computing devices associated with the service provider head end system.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Reference will now be made to the accompanying drawings, which are not necessarily drawn to scale, and wherein.

DETAILED DESCRIPTION OF THE INVENTION

Figure 1:
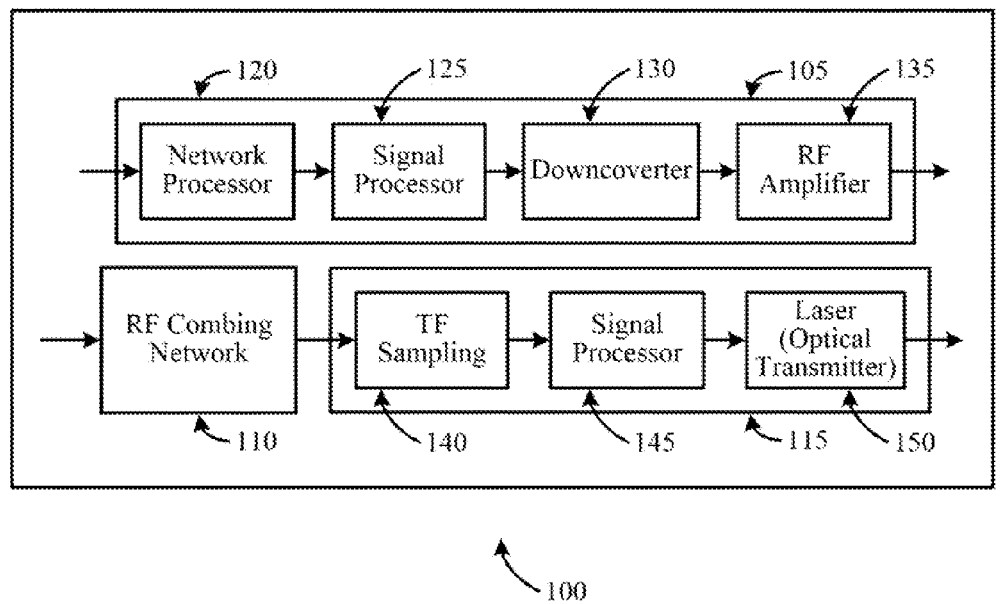
FIG. 1 illustrates a block diagram of a conventional HFC architecture that may be utilized to process content output by a service provider.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include architectures, systems, methods, apparatus, and devices for processing content to be output by a service provider for receipt by customer devices associated with customers of the service provider. In certain embodiments, digital content may be received by a service provider system from any number of content providers or other sources. For example, a plurality of signals including digital content, such as signals that utilize amplitude modulation, signals that utilize phase or quadrature modulation (e.g., quadrature phase-shift keying ("QPSK") signals, mult-phase shift keying ("MPSK") signals, etc.), signals that utilizes frequency modulation, and/or signals that utilize any combination of phase, amplitude and/or frequency modulation (e.g., quadrature amplitude modulation ("QAM") signals, pulse amplitude modulation ("PAM") signals, coded orthogonal frequency-division multiplexing ("COFDM") signals, etc.), may be received via one or more suitable network connections (e.g., Ethernet connections, etc.). The received digital content may be processed by one or more suitable signal processing components in order to generate data that may be more efficiently provided to a suitable transmission component, such as an optical transmitter. For example, received digital content may be digitally converted or mapped into symbols that may be more efficiently processed. In this regard, a suitable signal may be output by the service provider without the service provider converting received content into RF data that is subsequently sampled and converted back into digital data utilizing an RF combining network. Accordingly, noise and signal degradation may be reduced. Additionally, the power consumed by the service provider system may be reduced.

A wide variety of suitable techniques may be utilized to process incoming data. In one example embodiment, the received digital content for each signal may be mapped to one or more respective symbols for the signal. For example, one or more symbols that represent an in-phase portion and/or a quadrature phase portion may be determined for each signal. Data associated with the signal symbols (e.g., a plurality of data bits for each symbol) may then be mapped and/or stored in one or more suitable registers. The data stored in the register(s) may be read by one or more suitable devices, such as one or more digital-to-analog converters ("DACs"), that perform a direct radio frequency ("RF") synthesis on the data. The synthesized data may then be provided to one or more electro-optic conversion devices configured to prepare a signal (e.g., a light signal, etc.) that may be output onto an HFC network.

FIG. 1 illustrates a block diagram of a conventional hybrid fiber coax ("HFC") architecture 100 that may be utilized to process content output by a service provider. With reference to FIG. 1, the architecture 100 includes a modulator 105 or modulation component, an RF combining network 110, and a forward node optics component 115. The modulator 105 is a modulator or combination of modulators that process received digital content into an RF signal that is provided to the RF combining network, 110. For example, the modulator 105 may include a Quadrature Amplitude Modulation ("QAM") modulation device and/or a National Television System Committee ("NTSC") modulation device.

With continued reference to FIG. 1, the modulator 105 includes a network processor 120, a signal processor 125, a downconverter 130, and an RF amplifier 135. The network processor 120 is configured to receive or capture a data stream, and make the data stream available for subsequent processing by the modulator 105. The network processor 120 typically includes an Ethernet chipset or other suitable communications and/or network interfaces configured to receive a data stream from at least one content provider. A wide variety of suitable types of interfaces may be utilized by the network processor 120 to receive data, such as an Ethernet interface, an Asynchronous Serial Interface ("ASI"), a DigiCable Headend Expansion Interface ("DHEI"), or other interfaces. Additionally, a wide variety of suitable communications networks may be utilized to receive digital content.

The network processor 120 receives or captures a data stream and provides the data stream to the signal processor 125 via an internal link or connection capable of carrying a digital data stream, such as an Ethernet connection or other suitable digital connection. The signal processor 125 receives the data stream, and the signal processor 125 processes the data stream to create an image of the signal. The image is typically generated at a relatively high frequency, such as a frequency of greater than one gigahertz (1 GHz). In this regard, the generated image can be processed by the downconverter 130. In certain systems, the image may be generated at a lower frequency, and the image may be subsequently processed by an upconverter. However, an upconversion process is generally less efficient and introduces a greater amount of noise into the signal.

The target of the signal processor 125 is typically based on what the image is expected to look like in the RF domain in the head end. This image is similar to what the image should look like when received by one or more customer devices (e.g., set-top boxes). Once the digital content has been processed by the signal processor 125, the generated image or images are provided to the downconverter 130 (or upconverter) via a suitable communications link, such as an internal connection or communications link. The downconverter 130 includes circuitry that changes the center frequency of the received signal into a desired center frequency. The signal output by the downconverter 130 is then supplied to the RF amplifier 135, and the RF amplifier 135 amplifies the signal level or amplitude of the signal to a desired signal level.

Typically, the signal level is amplified to a desired level that facilitates overcoming RF losses within the head end.

Once received digital content or data has been processed by the modulator 105, an RF signal or RF data is output for provision to the RE combining network 110. Any number of suitable links and/or connections, such as a coaxial RF link (e.g., a 75 ohm coaxial link) are utilized to provide an output of the modulator 105 to the RF combining network 110. The RF combining network 110 includes a network of combiners and splitters that allow received RF signals to be combined together in order to form a signal that may be fed or provided to any number of target locations, such as customer devices. The process of RF combination typically leads to signal losses and introduces noise into the signal.

The combined RF signal output of the RF combining network 110 is provided to the forward node optics 115. The forward node optics 115 includes devices that facilitate downstream transmission of the received signal, such as downstream transmission to any number of optical nodes that facilitate distribution of an output signal to customers of the service provider. For example, the forward node optics 115 typically include a laser that transmits broadband data via optical fibers to one or more optical nodes. The optical nodes then convert the received broadband data into RF data that is distributed to customers of the service provider.

The forward node optics 115 include an RF sampling component 140, a second signal processor 145, and a transmission component 150, such as a laser transmitter. The RF sampling component 140 receives the analog signal output by the RF combining network 110, and the RF sampling component 140 samples the received signal in order to convert the received signal into digital data that can be processed by the second signal processor 145. The RF sampling component 140 samples the received signal at a rate of at least the Nyquist rate. Once the signal has been sampled in order to generate a digital signal or digital data stream, the digital signal is provided to the second signal processor 145 via any number of suitable internal connections or links, such as coaxial cables.

The second signal processor 145 receives the sampled digital data and converts the digital data into a format that can be optically transmitted by the forward node optics 115. Typically, the second signal processor 145 focuses on image generation, packing, and forward error correction when processing received digital data. Additionally, the processing of the second signal processor 145 is typically proprietary to a vendor or manufacturer of a fiber node or optical transmission node.

Once the digital data has been processed by the second signal processor 145, the digital data is provided to the transmission component 150 via one or more suitable internal links or connections. The transmission component 150 is typically a laser or optical transmitter. The transmission component 150 receives the data and utilizes a laser and/or wavelength-division multiplexing ("WDM") devices to transmit or drive the data onto one or more optical fibers that facilitate downstream transmission of the data. In this regard, the data may be received by downstream fiber nodes and converted into an RF format that can be received by customer devices.

The architecture 100 illustrated in FIG. 1 is provided by way of example only. Although the architecture 100 is representative of a conventional HFC head end architecture, other head end architectures may be utilized. However, these conventional HFC architectures all typically convert received digital data into analog RF data to facilitate RF combining and then convert the analog data back into digital data for transmission. These conversions typically introduce unwanted noise and require additional resources, such as power resources.

Figure 2:
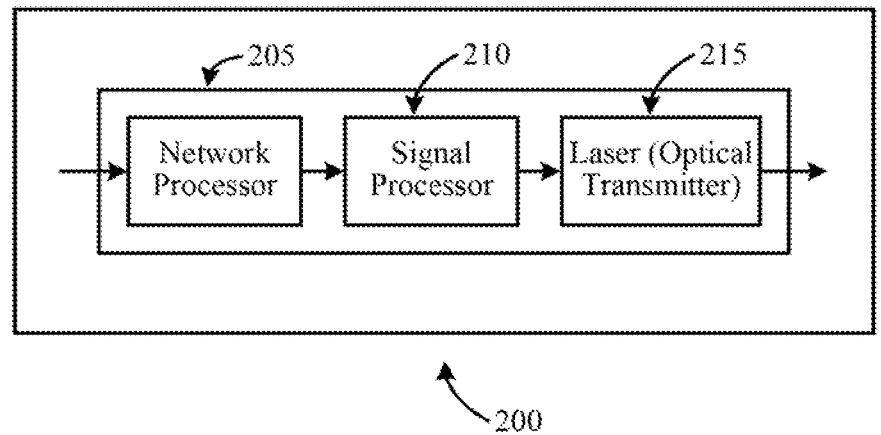
FIG. 2 illustrates a block diagram of an example architecture that may be utilized in accordance with various embodiments of the invention to process content output by a service provider.

FIG. 2 illustrates a block diagram of an example HFC architecture 200 that may be utilized in accordance with various embodiments of the invention to process content output by a service provider. The architecture 200 of FIG. 2 may perform unique signal processing on digital data received from content providers and/or other data sources. In certain embodiments, received digital signals may be converted or mapped into a format that is expected by a transmitter, such as a laser or optical transmitter, thereby eliminating the need for several of the components of conventional HFC architectures. As a result, greater efficiency may be attained.

With reference to FIG. 2, the HFC architecture 200 may include a network processor 205 or network processing component, a signal processor 210 or signal processing component, and/or a transmission component 215. The network processor 205 may be similar to the network processor 120 described above with reference to FIG. 1. The network processor 205 may be configured to receive a digital data stream or other digital data from any number of transmission networks, content providers, and/or data sources. For example, the network processor 205 may include any number of devices and/or communications interfaces configured to receive digital data, such as devices that include an Ethernet interface, an ASI interface, and/or a DHEI interface. Once digital data has been received or captured by the network processor 205, the digital data may be provided to the signal processor 210 via any number of suitable connections and/or links, such as a suitable serial link.

The signal processor 210 may receive the captured digital data and process the data to generate a plurality of symbols or other data that may be directly provided to or more efficiently processed before provision to the transmission component 215. In certain embodiments, the signal processor 210 may convert or map the digital data into a format that is expected by a laser or optical transmitter. As a result of this direct conversion or mapping, the actual analog signal that is expected to be seen by customer devices is not generated or created in the head end. In other words, the digital data is not converted into analog RF data that is provided to an RF combining network and subsequently converted back into digital data. In this regard, signal losses and noise within the head end system may be reduced. Additionally, the power consumption of the head end system may be reduced.

A wide variety of suitable devices and/or processing techniques may be utilized as desired by the signal processor 210 to process and/or map digital data. In certain embodiments, these devices and/or processing techniques may be specific to the types of optical transmitters or optical nodes that are utilized. For example, different processing may be performed on signals that are provided to different brands or types of optical nodes. In certain embodiments, the signal processor 210 may be specific to one type of optical node. In this regard, multiple signal processors may be provided for different optical nodes. In other embodiments, the signal processor 210 may identify a target node and process the digital data according to the requirements of the identified target node.

As desired, the signal processor 210 may include any number of processing components and/or digital filtering components. For example, the signal processor 210 may include any number of processor-driven devices, such as personal computers, mainframe computers, firmware devices, specialized hardware devices, and/or other suitable computing devices. The processor-driven devices may execute suitable programmed logic and/or computer-executable instructions that form a special-purpose computer or particular machine configured to process received digital data prior to the data being provided to an optical node or transmitter.

Once the digital data has been processed by the signal processor 210, the output of the signal processor 210 may be provided to the transmission component 215 via one or more suitable internal links or connections. In certain embodiments, a direct RF synthesis may be performed on the output, and the synthesized data may be provided to the transmission component 215. Additionally, as desired, the transmission component 215 may perform an electro-optic conversion on the synthesized data. Examples of suitable transmission components are lasers and/or optical transmitters. The transmission component 215 may receive the data and utilize a laser and/or wavelength-division multiplexing ("WDM") device to transmit or drive the data onto one or more optical fibers that facilitate downstream transmission of the data. In this regard, the data may be received by downstream fiber nodes and converted into an RF format that can be received by customer devices.

Embodiments of the invention may, eliminate or remove an RF combining network from an HFC architecture, which is typically a major source of noise and signal degradation. Additionally, elimination of an RF combining network may save a relatively large amount of space at the head end. Additionally, embodiments of the invention may eliminate or remove an integrated head end RF amplifier from an HFC architecture, thereby reducing power consumption at the head end. Moreover, certain embodiments of the invention may eliminate or remove one or more devices that facilitate pre-optics sampling, thereby improving the signal performance of the signal output by the head end. Estimates of signal performance improvement over conventional HFC architectures are at least 3 dB, although it may be possible to achieve greater signal performance improvement.

Moreover, as a result of reducing an amount of noise within the HFC architecture, there may be a potential to utilize higher order modulation while re-using existing HFC coaxial plants. Higher order modulation may translate into increases in data rates that may be output by the head end.

Additionally, because the transmission or output of the head end is directly tied to signal processing, there may be an opportunity to increase symbol rates associated with the transmission without introducing significant error. Such an increase in symbol rates may also lead to increases in data rates that may be output by the head end.

Figure 3:
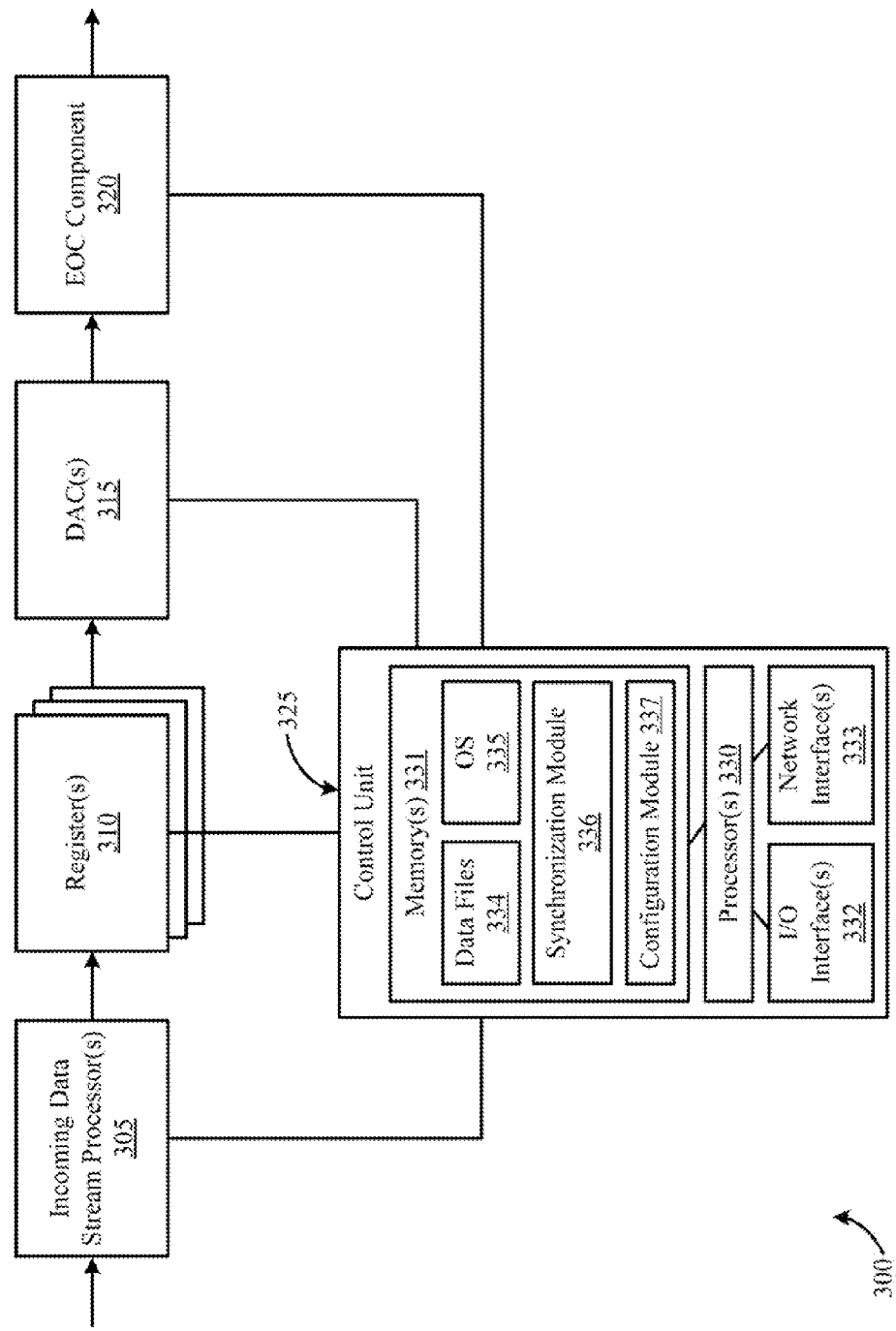
FIG. 3 illustrates a block diagram of another example architecture that may be utilized in accordance with various embodiments of the invention to process content output by a service provider.

FIG. 3 illustrates a block diagram of another example architecture 300 that may be utilized in accordance with various embodiments of the invention to process content output by a service provider. The architecture 300 illustrated in FIG. 3 is one example architecture that maps incoming data to symbols and processes the symbols utilizing improved signal processing techniques.

With reference to FIG. 3, the architecture 300 may include one or more incoming data stream processors 305, one or more registers 310, one or more digital-to-analog converters ("DACs") 315, one or more electro-optic conversion ("EOC") components 320, and/or one or more control units 325. As desired, each of these components may include any number of suitable processing components, memory devices, and/or interfaces. For example, each component may include specialized hardware components, firmware devices, and/or other computing devices. Additionally, in certain embodiments, one or more components may be configured to execute suitable programmed logic and/or computer-executable instructions that form a special-purpose computer or particular machine configured to process received digital data prior to the data being provided to an HFC network.

The incoming data stream processors 305 may include any number of suitable processing components and/or devices configured to receive incoming data, such as one or more incoming data streams. In certain embodiments, the incoming data may include a plurality of incoming data signals. These incoming data signals may include, but are not limited to, signals that utilize phase or quadrature modulation (e.g., quadrature phase-shift keying ("QPSK") signals, multi-phase shift keying ("MPSK") signals, etc.), signals that utilize frequency modulation, and/or signals that utilize any combination of phase, amplitude and/or frequency modulation (e.g., quadrature amplitude modulation ("QAM") signals, pulse amplitude modulation ("PAM") signals, coded orthogonal frequency-division multiplexing ("COFDM") signals, etc.). Additionally, the incoming data may be received from any number of suitable data sources, such as content providers, via any number of suitable transmission networks and or data links. As desired, the incoming data stream processors 305 may include or be associated with any number of devices and/or communications interfaces configured to receive data streams, such as devices that include an Ethernet interface, an ASI interface, and/or a DHEI interface.

Once data is received, the incoming data stream processors 305 may perform a wide variety of suitable processing on the received data. For example, processing may be performed to remove header information from the received data. As another example, the incoming data stream processors 305 may be configured to perform a wide variety of forward error correction and/or channel coding on the received data. As yet another example, the incoming data stream processors 305 may be configured to perform Reed-Solomon processing and/or other error correction operations on the incoming data. As yet another example, various contents, such as commercials, may be inserted into one or more data streams.

According to an aspect of the invention, the incoming data stream processors 305 may be configured to map received data into one or more symbols. For example, one or more respective symbols may be determined for each signal included in one or more incoming data streams. In certain embodiments, a symbol may represent an in-phase portion and/or a quadrature phase portion of a signal. In certain embodiments, a signal that will be output as a digital signal may include both in-phase and quadrature phase portions, while a channel that will be output as an analog signal may include (with some exceptions) only an in-phase portion. Additionally, any number of desired data bits may be included in a symbol mapping. For example, a relatively simple QPSK signal may be mapped to one or more symbols that include two data bits. As another example, a relatively simple QAM signal may be mapped to one or more symbols that include four data bits. More complex signals, such as 64-QAM or 256-QAM signals, may be mapped to symbols that include more data bits. In certain embodiments, a symbol may include between approximately two (2) and approximately sixteen (16) data bits, although a greater number of bits may be utilized as desired. In one example implementation, a symbol may include between approximately eight (8) and approximately sixteen (16) data bits. An example mapping for a QAM signal is described in greater detail below with reference to FIG. 7.

A wide variety of suitable devices and/or techniques may be utilized to map an incoming signal to one or more symbols that are representative of the signal. For example, a suitable state machine or special-purpose hardware device may be configured to process an incoming channel in order to determine or calculate one or more symbols for the channel. The symbols may include data bits that represent an in-phase portion and/or a quadrature phase portion of the channel for the sample. Additionally, as desired, a wide variety of suitable sample times or reference times may be utilized to periodically determine or calculate symbols for a channel. In certain embodiments, a sample time may be determined based at least in part upon a sample time or operational time of the one or more EOC components 320.

It is possible that the sample time of an EOC component 320 is different from a signal rate of a received signal. In these situations, the incoming data stream processors 305 may interpolate or otherwise calculate symbols for a received signal. As one example, a received signal may be associated with a signal rate of approximately 5.3 mega-symbols per second. However, an EOC component 320 may have a sample time of approximately 15 mega-symbols per second. Accordingly, a symbol expected by the EOC component 320 for the signal cannot be directly determined from the input data. In certain embodiments, symbols expected by the EOC component 320 may be calculated by the incoming data stream processors 305 based at least in part upon the sample rate of the EOC component 320 and the incoming signal data. For example, symbols may be interpolated utilizing data points included in the incoming data signal. One example of interpolating symbols is described in greater detail below with reference to FIGS. 8A and 8B.

Once respective symbols have been determined for a plurality of incoming data signals, data associated with the respective symbols (e.g., data bits for the symbols, etc.) may be mapped to and/or utilized to load at least one register or other suitable memory device. For example, each data bit for a symbol may be mapped to a suitable location within a register. The symbol data may then be read from the register by one or more suitable DACs that perform a direct RF synthesis on the symbol data. For purposes of this disclosure, the term "direct RF synthesis" may refer to the use of any number of suitable direct digital synthesis techniques to generate a modulated RF signal in the analog domain from digital data.

As desired in various embodiments, any number of registers 310 may be provided. Each register may be a suitable memory device configured to receive and store symbol data associated with any number of incoming channels. Additionally, a wide variety of suitable techniques may be utilized to determine a size of a register 310. In certain embodiments, the size of a register 310 may be determined based upon parameters associated with a downstream data signal output by a service provider, data associated with the received incoming data streams (e.g., incoming channels) and/or data associated with the EOC components 320.

As one illustrative example, the downstream signal output by a service provider (e.g., a cable service provider) may be a signal that includes frequencies from approximately fifty megahertz (50 MHz) to approximately one gigahertz (1 GHz). In other words, the bandwidth of the downstream data signal may be approximately 950 MHz. Accordingly, the downstream data signal may be capable of carrying approximately 950 mega-symbols per second. Given the 950 mega-symbols per second symbol rate, the sampling time of an EOC component 320 may be evaluated in order to determine a number of symbols to be stored in a register 310. For example, with an EOC sampling time of approximately one second, a register 310 may be designed and/or configured to store data associated with 950 mega-symbols. Thus, for a 6 MHz incoming QAM signal, data associated with six mega-symbols may be stored. As another example, with an EOC sampling time of approximately one millisecond, a register 310 may be designed and/or configured to store data associated with 950 symbols. Thus, for a 6 MHz incoming QAM signal, data associated with 6 symbols may be stored.

Additionally, a number of storage elements included in a register 310 may be determined based at least in part upon a number of bits associated with each symbol. For example, parameters associated with expected incoming data may be evaluated in order to determine a number of bits to be allocated to each symbol. For a relatively simple QPSK signal, two bits may be allocated to a symbol. For a QAM signal or other type of signal, approximately four to approximately sixteen bits may be allocated to a symbol. Once a number of bits to be allocated to each symbol has been determined, a total number of bits may be determined, and the register 310 may be sized accordingly.

In certain embodiments, a register 310 may additionally be used to store a wide variety of other information and/or data to be included in a downstream signal output by the service provider. As desired, at least a portion of this information may be stored in unused register locations allocated to certain incoming signals. For example, six mega-symbols may be assigned to a 6 MHz QAM signal; however, fewer than six mega-symbols may be utilized to represent the data in the signal. The remaining register space allocated to the signal may be utilized to store additional information. In this regard, data could be stored in the register space between channel information.

As explained in greater detail below, data stored in a register 310 may be read by one or more DACs 315 configured to perform a direct RF synthesis of the data. In certain embodiments, a plurality of registers 310 may be provided for reading. For example, a plurality of registers 310 may be provided in order to prevent overlaps in write and read operations to a register. For example, while a DAC is reading a first sample of data from a first register, a second sample of data may be written to a second register. The DAC or a second DAC may then read the second register. As desired, any number of registers 310 may be provided to facilitate read and write operations.

As another example, any number of registers 310 may be provided in order to provide respective symbol data to a plurality or bank of DACs 315. For example, a plurality of data samples may be stored in respective registers, and each register may be read by one or more DACs included in a bank of DACs. The outputs of the DACs may then be combined together in a synchronized manner.

With continued reference to FIG. 3, any number of DACs 315 may be provided. The DACs 315 may be configured to read symbol data from the one or more registers 310 and to perform a direct RF synthesis on the read symbol data. In this regard, an input to the one or more EOC components 320 may be generated. In certain embodiments, a single DAC may be utilized. In other embodiments, a plurality of DACs or a bank of DACs may be utilized. In the event that a plurality of DACs are utilized, the respective outputs of the DACs may be combined together in order to generate an input for the one or more EOC components 320. For example, the DACs may be time synchronized, and the respective outputs may be frequency combined together.

In certain embodiments of the invention, a number of DACs that are utilized may be determined based upon a wide variety of different factors, such as parameters associated with the downstream data signal and/or parameters associated with the registers 310 that are read by the DACs. As one example, a downstream data signal may have a bandwidth of approximately 950 MHz. Accordingly, the downstream data signal may include approximately 950 mega-symbols per second. In the event that sixteen data bits are allocated to each symbol, an effective data rate of the downstream signal is approximately 15.2 gigabits per second. In order to effectively sample the symbol data, a Nyquist sample rate of the DACs may be approximately 30.4 gigabits per second. In the event that a utilized DAC is capable of sampling at this frequency, a single DAC may be utilized. However, in the event that the DACs incorporated into the architecture are not capable of sampling at the desired Nyquist frequency, a plurality of DACs may be utilized. As another example, plurality of DACs may be utilized to facilitate the reading of symbol data from a plurality of different registers.

Once an RF synthesis is performed by the DAC(s) 315, the synthesized data may be provided to any number of electro-optic conversion ("EOC") components 320. An EOC component 320 may be a suitable device and/or system configured to convert the synthesized data into optical data. In other words, an EOC component may be configured to convert synthesized data into a light signal or an optical signal that may be output onto an HFC network or provided to a fiber node. In this regard, a downstream signal, such as a downstream broadband data signal, may be generated and output by a service provider.

With continued reference to FIG. 3, one or more control units 325 may be provided. A control unit 325 may be a suitable component or device configured to synchronize and/or control the operations of one or more of the other components of the architecture 300. For example, the control unit 325 may synchronize the sampling of incoming data streams (e.g., incoming signals) with the read operations performed by the DAC(s) 315. In this regard, the data read from the one or more registers 310 by the DAC(s) may include appropriate sample data. As desired, a control unit 325 may include any number of processor-driven devices, such as personal computers, mainframe computers, firmware devices, specialized hardware devices, and/or other suitable computing devices. The processor-driven devices may execute suitable programmed logic and/or computer-executable instructions that form a special-purpose computer or particular machine configured to synchronize operations within an HFC architecture 300 and/or configured to establish operating parameters for the HFC architecture 300.

In addition to having one or more processors 330, the control unit 325 may include any number of suitable memory devices 331, input/output ("I/O") interfaces 332, and/or network interfaces 333. The memory devices 331 may include any number of suitable memory devices, such as read-only memory devices, random access memory devices, magnetic storage devices, etc. The memory devices 331 may be configured to store, for example, data files 334 and/or various software modules and/or executable instructions that may be executed by the one or more processors, such as an operating system ("OS") 335, a synchronization module 336, and/or a configuration module 337. The data files 334 may include any suitable data that facilitates the general operation of the control unit 325 and/or the processing of incoming data. For example, the data files 334 may include various settings and/or configuration information associated with one or more EOC components 320, register information, information associated with unused memory locations in one or more registers, information and/or parameters associated with one or more incoming data streams, information associated with one or more DACs 315, and/or information associated with combining the outputs of a plurality of DACs.

The OS 335 may be a suitable software module that facilitates the general operation of the control unit 325. Additionally, the OS 335 may facilitate the execution of any number of other software modules, such as the synchronization module 336 and/or the configuration module 337. The synchronization module 336 may include one or more suitable modules and/or applications that facilitate timing and/or synchronization of other components of the architecture 300. In operation, the synchronization module 336 may synchronize and/or control the sampling of incoming data and the subsequent writing of data to the registers 310. In certain embodiments, a sampling rate may be synchronized with a sampling rate associated with the EOC components 320. The synchronization module 336 may additionally synchronize and/or control the reading of data from the registers 310 by the DACs. As desired, the synchronization module 336 may additionally control the combination of DAC outputs.

The configuration module 337 may include one or more suitable modules and/or applications that facilitate the establishment of operating parameters for one or more other components of the architecture 300. For example, the configuration module 337 may allocate memory space in one or more registers 310. As another example, the configuration module 337 may establish sampling rates for various components of the architecture 300.

In certain embodiments, the control unit 325 may additionally include one or more suitable modules and/or applications that control the storage of additional data in the one or more registers 310. For example, the control unit 325 may control the storage of data in unused memory locations between signals. The control unit 325 may additionally track and/or manage the additional data in order to facilitate reading of the data and/or incorporation of the data into a broadband data stream.

The one or more I/O interfaces 332 may facilitate communication between the control unit 325 and one or more input/output devices, such as a display, keypad, control panel, touch screen display, microphone, speaker, etc., that facilitate user interaction with the control unit 325. In this regard, user commands may be received by the control unit 325. The network interfaces 333 or communications interfaces may facilitate connection of the control unit 325 to any number of suitable networks, connections, and/or links. For example, the network interfaces 333 may facilitate connection of the control unit 325 to one or more suitable local area networks and/or direct communications channels that facilitate communication with other components of the architecture 300. As another example, the network interfaces 333 may facilitate connection to any number of other networks, such as the Internet or another suitable wide area network.

Other components of the architecture 300 may include components similar to those described above for the control unit 325. For example, other components of the architecture 300 may include any number of processing devices, memory devices, I/O interfaces, and/or network interfaces. Additionally, as desired, certain components of the architecture may include special-purpose hardware, software, and/or firmware components configured to provide desired functionality.

Figure 4:
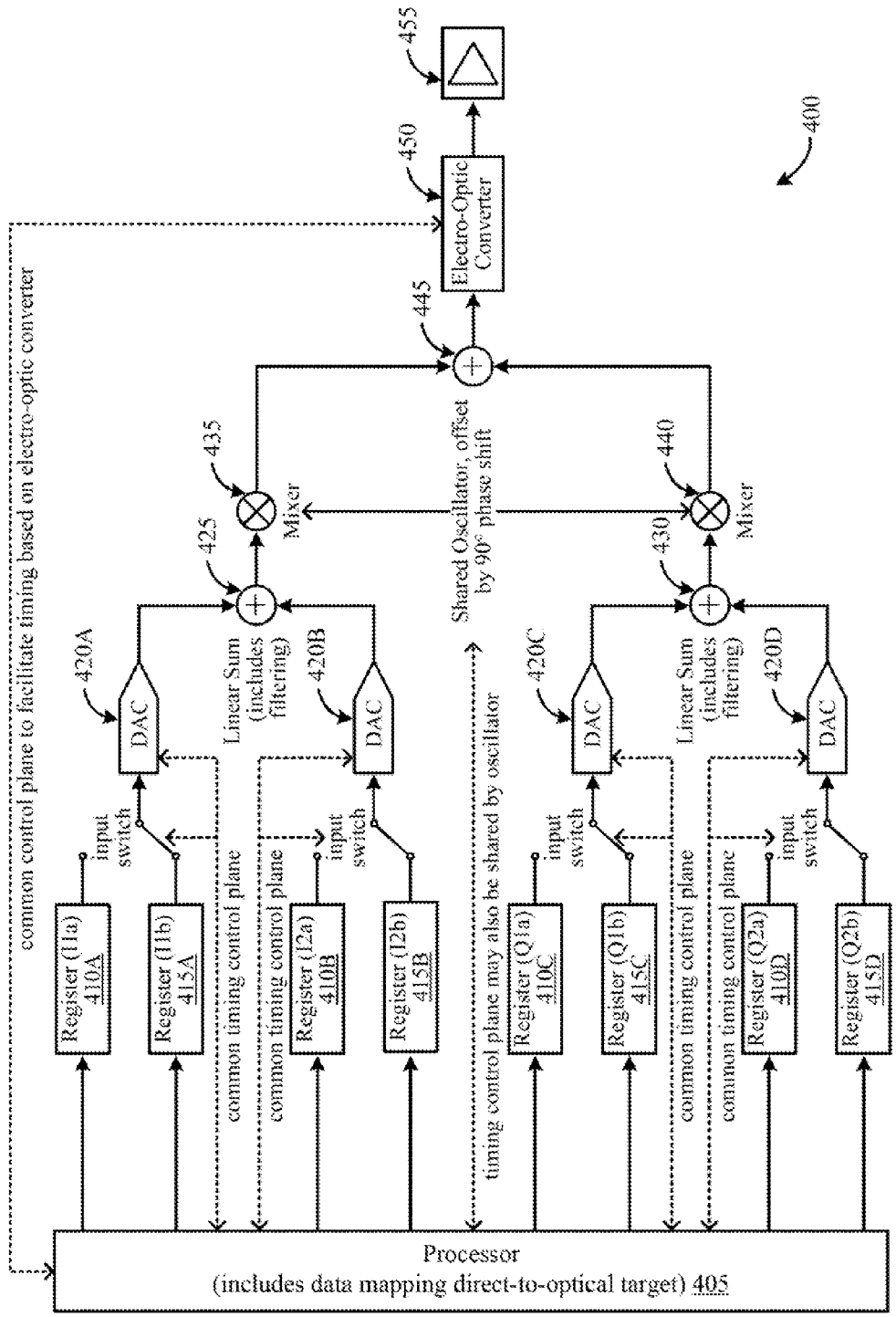
FIG. 4 illustrates a block diagram of another example architecture that may be utilized in accordance with various embodiments of the invention to process content output by a service provider.

FIG. 4 illustrates a block diagram of another example architecture 400 that may be utilized in accordance with various embodiments of the invention to process content output by a service provider. The architecture 400 illustrated in FIG. 4 is an example architecture that utilizes a plurality of registers and DACs to process incoming data in a format expected by an EOC component. The example architecture 400 may include a signal processor 405, a plurality of registers 410A-D, 415A-D, a plurality of DACs 420A-D, a plurality of linear summation circuits 425, 430, 445 or combiners, a plurality of mixers 435, 440, an electro-optic converter ("EOC") 450, and/or an optical amplifier 455.

With reference to FIG. 4, a suitable signal processor 405, which may be similar to the incoming data stream processors 305 illustrated in FIG. 3, may be configured to receive and process incoming data streams that include any number of incoming data signals. The signal processor 405 may determine one or more symbols associated with each of the incoming signals. In certain embodiments, the symbols may be determined in accordance with a sample rate or expected feed rate of the EOC 450. For example, symbols may be interpolated from incoming data in accordance with a sample rate of the EOC 450. In this regard, the symbols may be in a form expected by the EOC 450.

Once a set of symbols has been identified or determined for the signals, the signal processor 405 may direct storage of symbol data in any number of suitable registers 410A-D. For example, symbol data (e.g., data bits) that represents an in-phase portion of the incoming signals may be stored in a first group of registers 410A, 410B, and symbol data that represents a quadrature phase portion of the incoming signals may be stored in a second group of registers 410C, 410D. Each of these registers 410A-D may be configured to store a number of data bits that may be read and processed by one of the DACs 420A-D. In operation, each DAC 420A, 420B, 420C, 420D may read symbol data from a suitable register in order to perform a direct RF synthesis on the symbol data.

With continued reference to FIG. 4, a second group of registers 415A-D may be provided in certain embodiments of the invention. As desired, symbol data may be stored in the second group of registers 415A-D while the DACs 420A-D read previously stored symbol data from the first group of registers 410A-D. The inputs to the DACs 420A-D may then be switched to the second group of registers 415A-D in order to read the data stored in the second group of registers 415A-D while the first group of registers 410A-D is loaded with new symbol data. This process may be repeated as desired to process incoming signals. In this regard, overlaps in write and read operations to a register may be avoided.

As shown in FIG. 4, a plurality of DACs 420A-D may be utilized in order to perform a direct RF synthesis on symbol data. The respective outputs of the plurality of DACs 420A-D may then be combined in order to prepare an input to the EOC 450. For example, the outputs of the DACs 420A, 420B that process an in-phase portion of the symbol data may be combined by a first suitable linear summation circuit 425. Similarly, the outputs of the DACs 420C, 420D that process a quadrature phase portion of the symbol data may be combined by a second suitable linear summation circuit 430. The linear summation circuits 425, 430 may add the received outputs together while performing suitable filtering functions to remove noise. For example, the linear summation circuits 425, 430 may function as band-pass filters in order to remove noise that falls outside of expected frequency ranges. The outputs of the linear summation circuits 425, 430 may then be provided to suitable mixers 435, 440 configured to add phase modulation or phase shifting to the outputs. For example, the mixers 435, 440 may operate to form a ninety degree phase shift between the in-phase and quadrature phase portions. The outputs of the mixers 435, 440 may then be provided to a suitable combiner 445 or linear summation circuit in order to prepare an input to the EOC 450.

The EOC 450 may sample the received data and perform an electro-optic conversion on the data. In this regard, a downstream data signal to be output by a service provider may be generated. For example, a light signal or optical signal may be generated. As desired, a number of suitable optical amplifiers 455 may be utilized to amplify the signal prior to and/or during its transmission to remote fiber nodes.

The architectures 200, 300, 400 shown in and described with respect to FIGS. 2-4 are provided by way of example only. Numerous other operating environments, system architectures, and device configurations are possible. Other architectures can include fewer or greater numbers of components and may incorporate some or all of the functionality described with respect to the components shown in FIGS. 2-4. Accordingly, embodiments of the invention should not be construed as being limited to any particular system architecture, operating environment, or device configuration.

Figure 5:
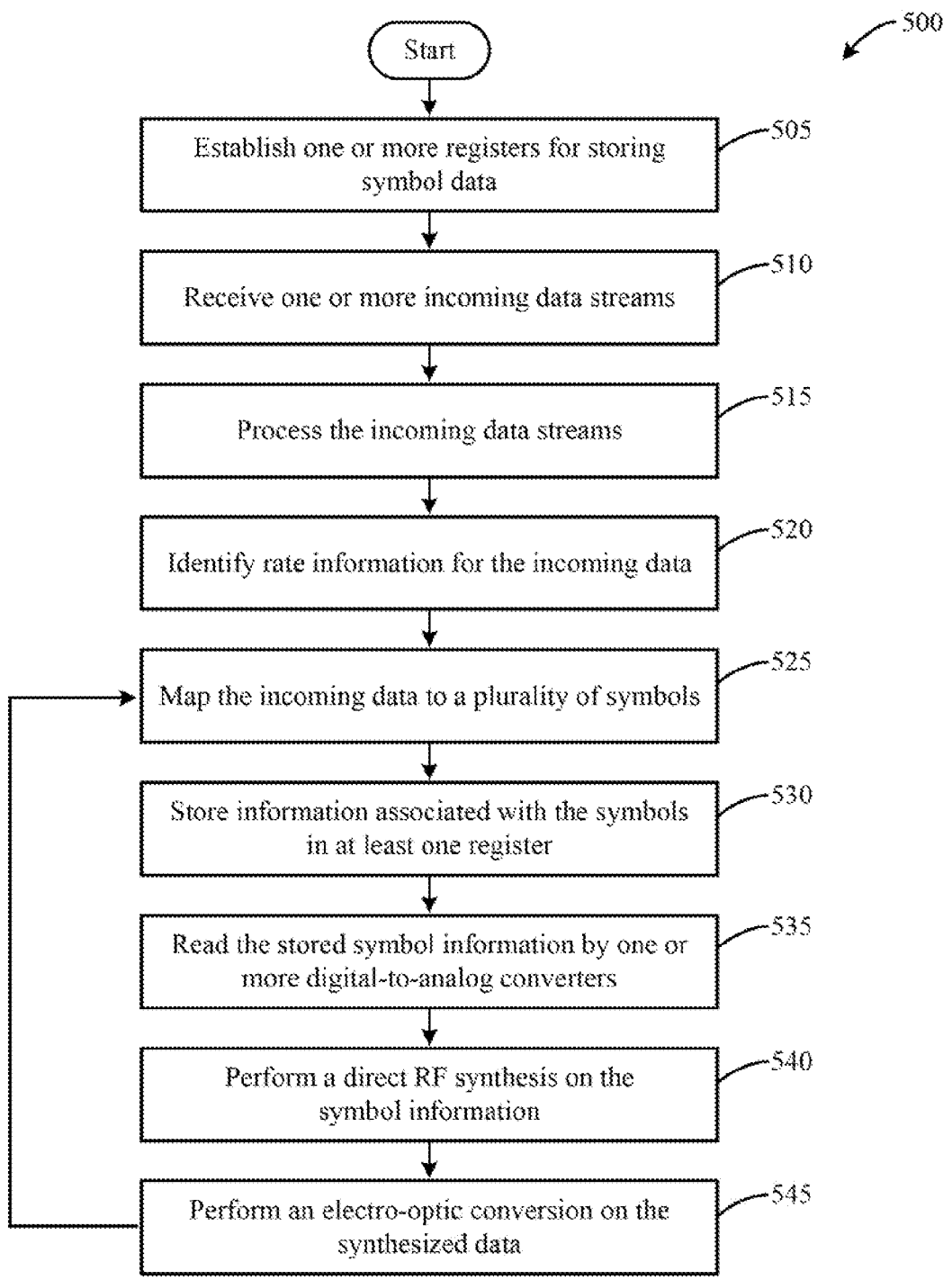
FIG. 5 is a flow diagram of an example method that may be utilized to process content output by a service provider, according to an illustrative embodiment of the invention.

FIG. 5 is a flow diagram of an example method 500 that may be utilized to process content output by a service provider, according to an illustrative embodiment of the invention. In certain embodiments, the operations of the method 500 may be performed by a suitable HFC architecture or head end system, such as the architecture 300 illustrated in FIG. 3 or the architecture 400 illustrated in FIG. 4. The method 500 may begin at block 505.

At block 505, one or more registers may be established for storing symbol data associated with received incoming streams and/or channels. As described above with reference to FIG. 3, a wide variety of suitable register configurations may be utilized as desired in various embodiments of the invention. Additionally, the size of a register may be determined or calculated based upon a wide variety of suitable parameters, such as parameters associated with a downstream data signal, a sampling rate of an EOC component, and/or parameters associated with incoming or received data. One example of the suitable operations that may be performed in order to establish a register is described in greater detail below with reference to FIG. 6.

At block 510, one or more incoming data streams may be received from any number of suitable sources, such as one or more content providers. As desired, one or more data streams may additionally be generated by a service provider and provided to an HFC architecture. A data stream may include any number of suitable signals and/or components, such as signals that utilize phase or quadrature modulation (e.g., quadrature phase-shift keying ("QPSK") signals, multi-phase shift keying ("MPSK") signals, etc.), signals that utilize frequency modulation, and/or signals that utilize any combination of phase, amplitude and/or frequency modulation (e.g., quadrature amplitude modulation ("QAM") signals, pulse amplitude modulation ("PAM") signals, coded orthogonal frequency-division multiplexing ("COFDM") signals, etc.). Additionally, a wide variety of suitable network interfaces and/or other components may facilitate the receipt of the one or more incoming data streams. In certain embodiments, the received data may include digital data to be processed by an HFC architecture.

At block 515, a wide variety of suitable processing may be performed on one or more of the received data streams. For example, processing may be performed to remove header information from received data. As another example, a wide variety of forward error correction and/or channel coding may be performed. As yet another example, Reed-Solomon processing and/or other error correction operations may be performed. As yet another example, various contents, such as commercials, may be inserted into one or more data streams and/or signals.

At block 520, rate information for the incoming or received data may be determined. For example, a signal rate for a received signal may be determined. At block 525, the incoming data may be mapped to a plurality of symbols that represent the data. For example, one or more respective symbols may be determined for each signal included in the incoming data. As desired, a wide variety of suitable rates and/or references may be utilized to process the data and determine the symbols, such as a rate that matches a sampling rate of a suitable EOC component. Additionally, in certain embodiments, one or more symbols may be interpolated based upon data included in an incoming signal and the sampling rate of an EOC component.

A wide variety of suitable devices and/or techniques may be utilized to map an incoming signal to one or more symbols that are representative of the signal. For example, a suitable state machine or special-purpose hardware device may be configured to interpolate, determine, or calculate one or more symbols for the signal. Each symbol may include any number of data bits that represent an in-phase portion and/or a quadrature phase portion of the signal at a desired reference point or at a desired time associated with a sample of the EOC component.

At block 530, the information associated with the symbols may be stored in at least one register. For example, the respective data bits associated with each symbol may be stored in at least one register. According to an aspect of the invention, the stored data may be in a format that is expected by a suitable EOC component and/or transmission component associated with a service provider head end. In this regard, a wide variety of RF conversion and/or RF combining processes performed by conventional HFC architectures may be avoided. Additionally, signal noise may be reduced.

At block 535, one or more digital-to-analog converters ("DACs") may read the stored symbol information from the one or more registers. The DACs may be configured to perform a direct RF synthesis on the symbol data at block 540. In this regard, an input to one or more EOC components may be generated. In certain embodiments, a single DAC may be utilized. In other embodiments, a plurality of DACs or a bank of DACs may be utilized. In the event that a plurality of DACs are utilized, the respective outputs of the DACs may be combined together. For example, the DACs may be time synchronized, and the respective outputs may be frequency combined together.

At block 545, the output of a DAC or the combined outputs of a plurality of DACs may be provided to one or more suitable EOC components. The EOC components may be configured to perform an electro-optic conversion on the synthesized data. In this regard, a downstream data signal (e.g., a downstream component of a broadband signal, etc.) may be generated, and the downstream data signal may be output onto a suitable HFC network. For example, a light or optical signal may be generated and output onto one or more suitable optical fibers for transmission to a downstream optical fiber node included in an HFC network.

The method 500 may be periodically and/or continually executed in order to process incoming data and process the data into a downstream broadband data signal output by a service provider. For example, following the processing of each set of symbols, another set of symbols associated with the incoming data may be identified and processed.

Figure 6:
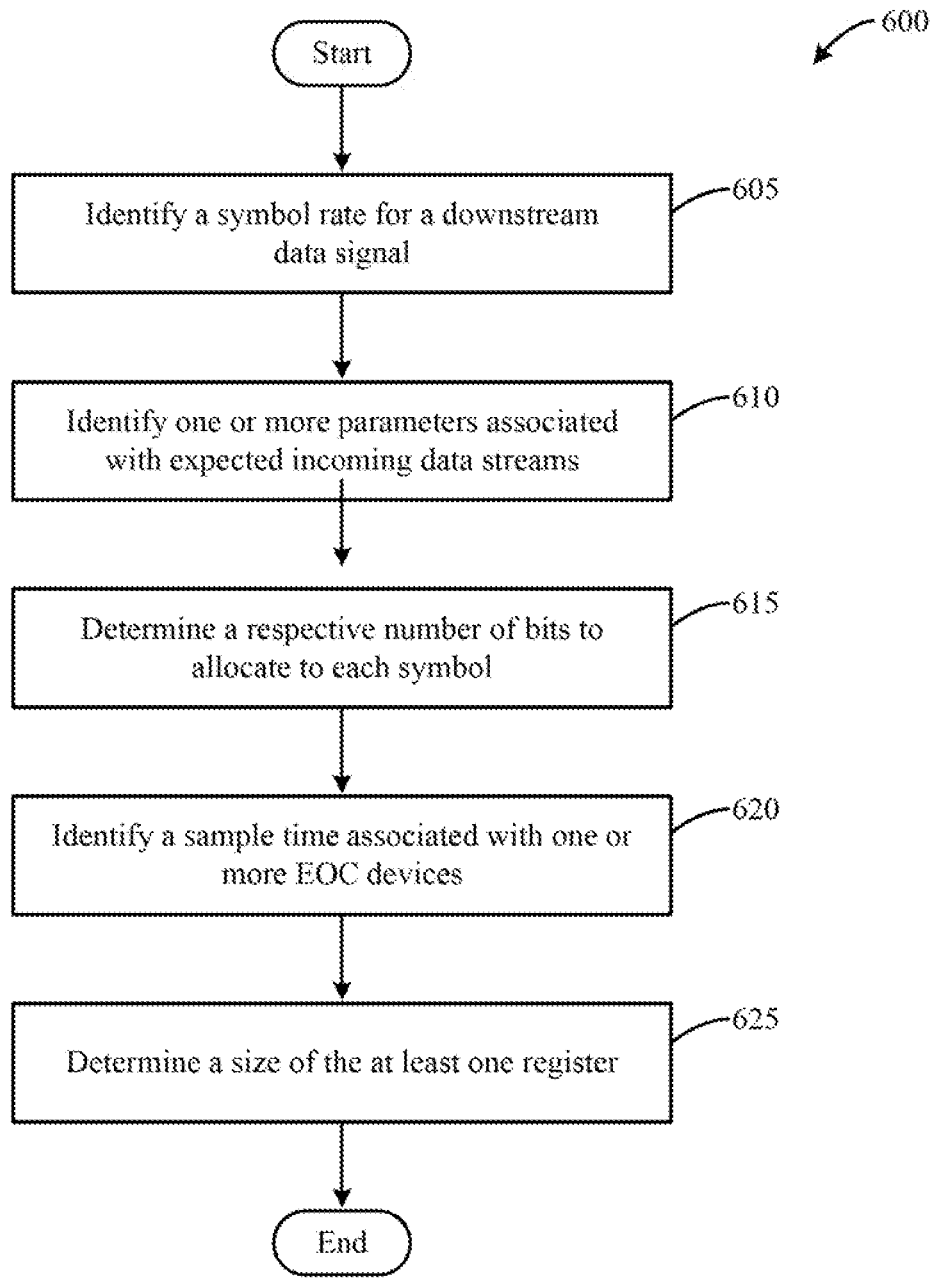
FIG. 6 is a flow diagram of an example method for establishing one or more registers that may be utilized to store symbol data, according to an illustrative embodiment of the invention.

FIG. 6 is a flow diagram of an example method 600 for establishing one or more registers that may be utilized to store symbol data, according to an illustrative embodiment of the invention. The method 600 may be a suitable method for determining a size of one or more registers to be included in an HFC architecture, such as the registers 310 illustrated in the architecture 300 of FIG. 3 or the registers 410A-D, 415A-D illustrated in the architecture 400 of FIG. 4. In certain embodiments, the method 600 is one example of the operations that may be performed at block 505 of the method 500 illustrated in FIG. 5. The method 600 may begin at block 605.

At block 605, a symbol rate associated with a downstream data signal may be identified or determined. For example, a bandwidth of a downstream data signal may be identified, and the symbol rate may be determined from the bandwidth. Utilizing the example described above with reference to FIG. 3, a downstream data signal may have a bandwidth of approximately 950 MHz. Accordingly, a downstream data signal may have a symbol rate of approximately 950 mega-symbols per second.

At block 610, one or more parameters associated with expected incoming data streams and/or incoming channels may be identified. For example, types (e.g., QPSK, QAM, etc.) associated with incoming data streams may be determined. In this regard, a number of symbols that will be utilized to represent a data stream and/or a number of respective data bits to associate with each channel may be determined at block 615. For example, it may be determined that approximately eight to sixteen bits will be allocated to a QAM channel.

At block 620, a sample time or sample rate associated with an EOC component may be identified. A sample rate for sampling the incoming data and storing data in the registers may then be determined based upon an EOC sample rate. In this regard, a size of at least one register may be determined at block 625. For example, with an EOC sampling time of approximately one second, a register may be designed and/or configured to store data associated with 950 mega-symbols. Thus, for a 6 MHz incoming QAM channel, data associated with six mega-symbols (6,000 symbols) may be stored, and eight to sixteen bits may be allocated to each symbol included in the six mega-symbols. As another example, with an EOC sampling time of approximately one millisecond, a register may be designed and/or configured to store data associated with 950 symbols. Thus, for a 6 MHz incoming QAM channel, data associated with 6 symbols may be stored, and eight to sixteen bits may be allocated to each symbol.

Additionally, a number of storage elements included in a register 310 may be determined based at least in part upon a number of bits associated with each symbol. For example, parameters associated with expected incoming data may be evaluated in order to determine a number of bits to be allocated to each symbol. For a relatively simple QPSK signal, two bits may be allocated to a symbol. For a QAM signal or other type of channel, approximately four to approximately sixteen bits may be allocated to a symbol. Once a number of bits to be allocated to each symbol has been determined, a total number of bits may be determined, and the register 310 may be sized accordingly.

The method 600 may end following block 625.

The operations described and shown in the methods 500, 600 of FIGS. 5-6 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 5-6 may be performed.

Figure 7:
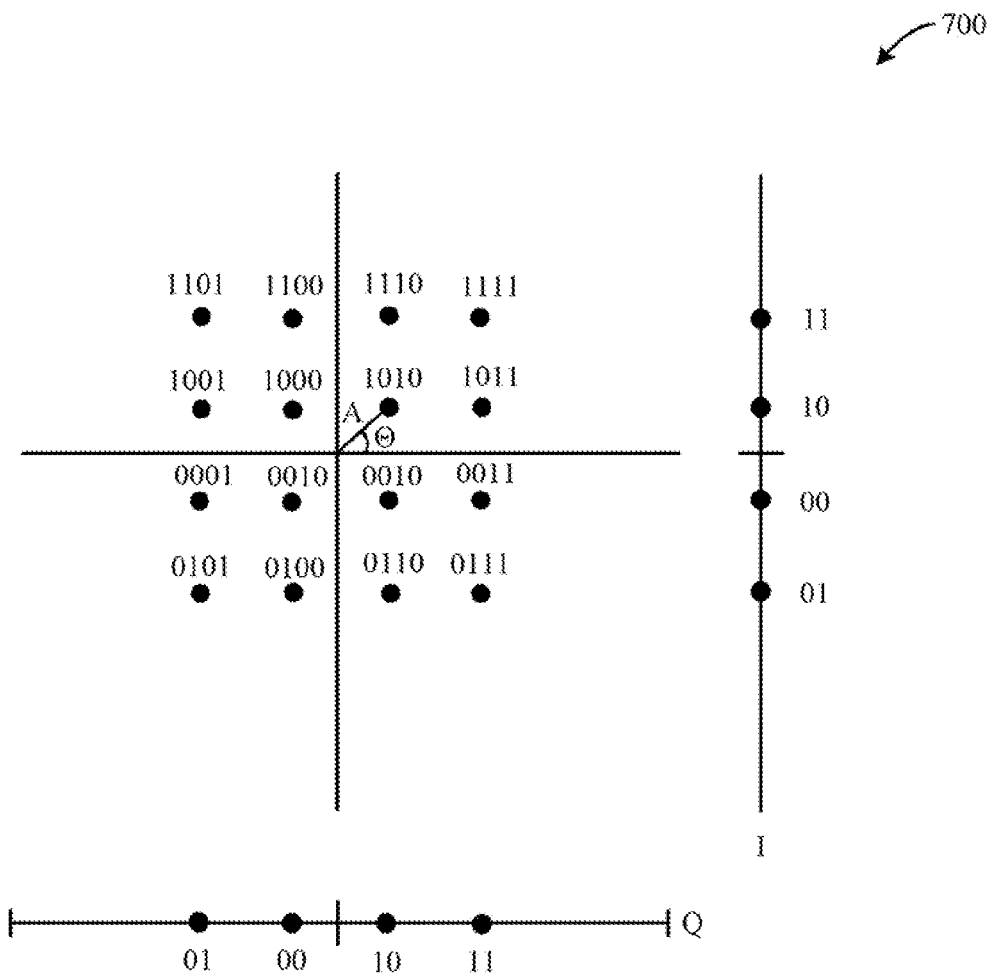
FIG. 7 illustrates an example map of a QAM data stream or signal, according to an illustrative embodiment of the invention.

FIG. 7 illustrates an example mapping 700 of a QAM data stream or signal, according to an illustrative embodiment of the invention. The mapping 700 may be utilized to generate or determine symbols associated with the QAM signal. In a binary digital modulation system, only one of two possible signals can be transmitted during each signal interval. However, because signals have both real and imaginary components, multi-phase shift keying ("MPSK") and quadrature phase shift keying ("QPSK") are utilized to transmit a greater amount of information in a smaller bandwidth. QPSK considers the signal in both the real and imaginary domains rather than limiting its analysis to the real portion of the signal. Generally, the real portion of the signal may be referred to as the "in-phase" portion, and the imaginary portion of the signal may be referred to as the "quadrature phase" portion. To further increase the storage capacity of a signal or medium, an amplitude modulation scheme, such as a QAM scheme, may be utilized. Generally, QAM is a form of QPSK that incorporates amplitude modulation along with phase modulation.

In a relatively simple QAM scheme, such as the scheme illustrated in FIG. 7, a phase modulator may incorporate four (4) bits/symbol in order to obtain sixteen (16) possible amplitude/phase state combinations for a channel. For each data point illustrated in FIG. 7, an amplitude may be represented by a distance between the data point and the origin, and a phase may be represented by an angle between the data point and the origin. As desired, additional bits may be incorporated into each symbol to increase the number of possible data states. For example, 64-QAM combines six (6) bits per symbol to produce sixty-four (64) possible states, while 256-QAM combines eight (8) bits per symbol to produce 256 possible states. Indeed, a wide variety of different types of modulation schemes may be utilized as desired in various embodiments of the invention. For each scheme, an appropriate symbol mapping may be performed, and an appropriate number of data bits may be identified for storage in one or more suitable data registers.

Figure 8A:
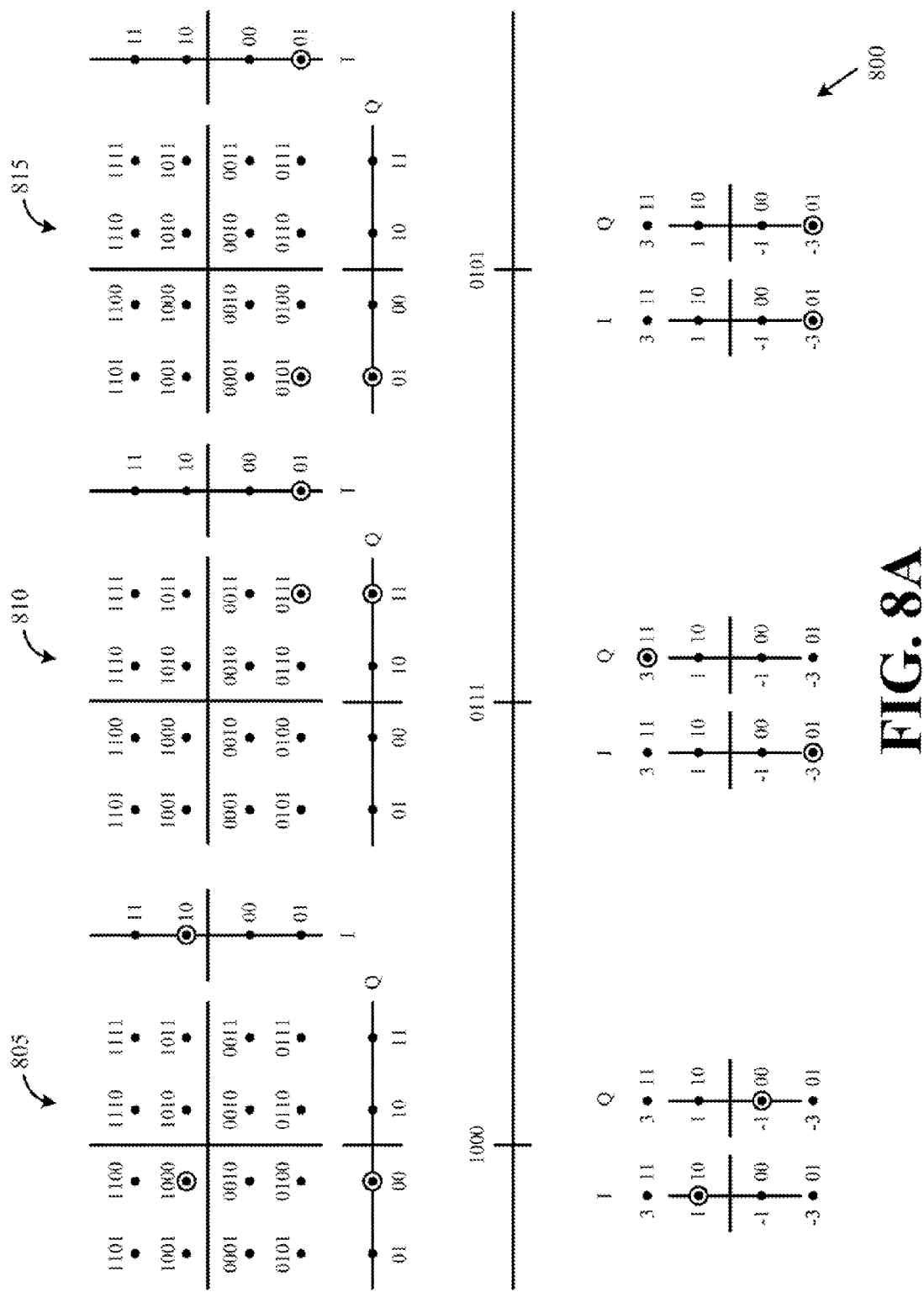
FIGS. 8A and 8B illustrate an example mapping for interpolating symbols based at least in part upon a sample rate of an electro-optic conversion component, according to an illustrative embodiment of the invention.
Figure 8B:
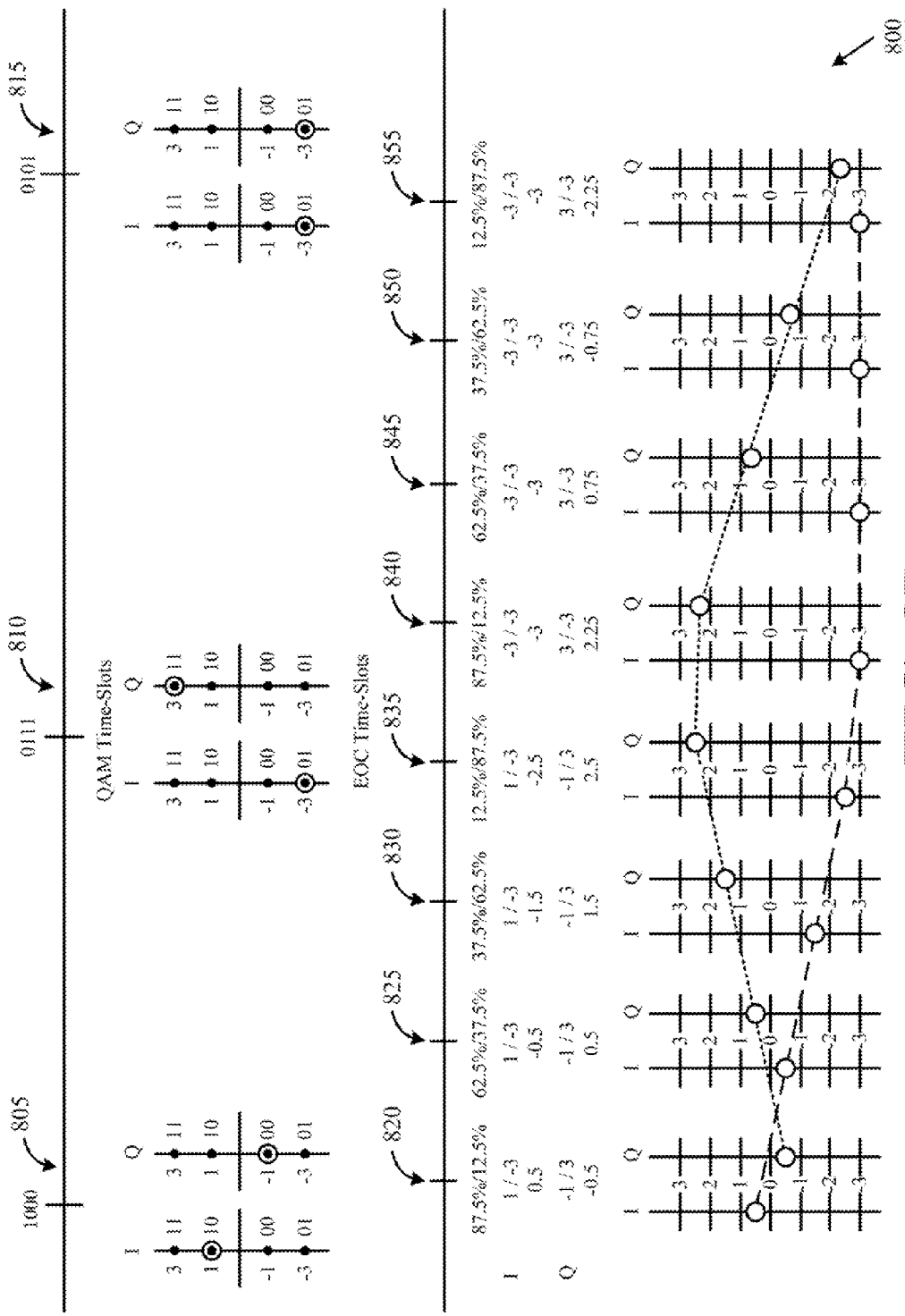

FIGS. 8A and 8B illustrate an example mapping 800 of interpolating symbols based at least in part upon a sampling rate of an electro-optic conversion component, according to an illustrative embodiment of the invention. The diagram 800 illustrates an example of interpolating symbols when the signal rate of a received input stream (e.g., a QAM signal, etc.) does not match the sampling rate of an EOC component.

With reference to FIG. 8A, three example QAM time slots 805, 810, 815 are illustrated. For each QAM time slot, a value of a QAM signal at the relevant time slot is illustrated. For example, a first QAM time slot 805 may have a signal value of "1000", a second QAM time slot 810 may have a signal value of "0111", and a third QAM time slot 815 may have a signal value of "0101". With continued reference to FIG. 8A, each of these QAM signal values has been separated into its "in-phase" portion and its "quadrature phase" portion. Additionally, for each signal value, the amplitudes of the "in-phase" portions and "quadrature phase" portions are illustrated. For example, with respect to the first time slot 805, the "in-phase" portion may have an amplitude of approximately one (1), and the "quadrature phase" portion may have an amplitude of approximately minus one (-1). As another example, with respect to the second time slot 810, the "in-phase" portion may have an amplitude of approximately minus three (-3), and the "quadrature phase" portion may have an amplitude of approximately three (3). The illustrated amplitudes are provided by way of example only, and other amplitudes may be utilized as desired.

With reference to FIG. 8B, a plurality of sampling time slots 820, 825, 830, 835, 840, 845, 850, 855 for the EOC component are also illustrated. Additionally, the sampling rate of the EOC component does not match the signal rate of the QAM signal. For example, as illustrated, four sampling time slots for the EOC component fall between each of the QAM time slots. According to an aspect of the invention, symbols may be interpolated for each of the EOC sampling time slots based at least in part upon the data associated with the QAM time slots.

As desired in certain embodiments, a linear interpolation may be performed in order to determine a symbol for each of the EOC time slots. For example, with reference to FIG. 8B, a first EOC time slot 820 may fall approximately one-eighth of the distance between the first QAM time slot 805 and the second QAM time slot 810. Accordingly, in order to determine an "in-phase" amplitude for the first EOC time slot 820, an interpolation may be performed utilizing the "in-phase" amplitudes of the first QAM time slot 805 and the second QAM time slot 810. Thus, with the first EOC time slot 820 falling approximately one-eighth of the distance between the two relevant QAM time slots 805, 810, the "in-phase" amplitude of the first EOC time slot 820 may be determined as ($7/8$)(first QAM time slot in-phase amplitude)+($1/8$)(second QAM time slot in-phase amplitude). This calculation yields (0.875)(1)+(0.125)(-3) or 0.5. The "quadrature phase" amplitude of the first EOC time slot 820 may be calculated in a similar manner to produce a result of ($7/8$)(-1)+($1/8$)(3) or -0.5.

As another example, a second EOC time slot 825 may fall approximately three-eighths of the distance between the first QAM time slot 805 and the second QAM time slot 810. Thus, an "in-phase" amplitude of the second EOC time slot 825 may be determined as ($5/8$)(first QAM time slot in-phase amplitude)+($3/8$)(second QAM time slot in-phase amplitude). This calculation yields (0.625)(1)+(0.375)(-3) or -0.5. The "quadrature phase" amplitude of the second EOC time slot 825 may be calculated in a similar manner to produce a result of ($5/8$)(-1)+($3/8$)(3) or 0.5. The illustrated values for the remaining EOC time slots 830, 835, 840, 845, 850, 855 may be calculated in a similar manner. The interpolated "in-phase" and "quadrature phase" values for the various EOC time slots 830, 835, 840, 845, 850, 855 are illustrated in FIG. 8B.

It will be appreciated that a wide variety of EOC component sampling rates and QAM signal rates may be utilized as desired. In this regard, a wide variety of different interpolations may be completed as desired. The various rates illustrated in FIG. 8 are provided by way of example only.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be roaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

That which is claimed:

1. A method for processing content at a service provider head end system, the method comprising:
   receiving incoming data associated with a plurality of signals to be output by the service provider head end system;
   mapping the incoming data to a plurality of symbols, each symbol comprising a plurality of data bits that represent an in-phase portion and a quadrature phase portion of a respective signal included in the plurality of signals;
   mapping the respective plurality of data bits for each symbol to at least one data register;
   providing the contents of the at least one register to one or more digital-to-analog converters to facilitate a direct radio frequency synthesis;
   providing the output of the one or more digital-to-analog converters to one or more electro-optic conversion devices configured to output a downstream data signal;
   identifying a symbol rate associated with the outputted downstream data signal;
   determining a respective number of data bits to be allocated to each symbol;
   identifying a sample time associated with the one or more electro-optic conversion devices; and
   determining, based at least in part upon the symbol rate, the sample time, a modulation technique and a bandwidth of the outputted downstream data signal, a size of the at least one data register, wherein the above operations are performed by one or more computing devices associated with the service provider head end system.

2. The method of claim 1, wherein mapping the plurality of data bits to the at least one data register comprises mapping respective samples of the plurality of data bits in accordance with a sample time associated with the one or more electro-optic conversion devices.

3. The method of claim 1, wherein receiving incoming data associated with a plurality of signals comprises receiving data associated with at least one of (i) a signal that utilizes amplitude modulation, (ii) a signal that utilizes phase modulation, (iii) a signal that utilizes frequency modulation, or (iv) a signal that utilizes any combination of amplitude, phase, and frequency modulation.

4. The method of claim 1, wherein mapping the plurality of data bits for each symbol to at least one data register comprises:
   mapping a first sample of the plurality of data bits to a first register; and
   mapping a second sample of the plurality of data bits to a second register.

5. The method of claim 1, wherein providing the contents of the at least one register to one or more digital-to-analog converters comprises providing the contents to a plurality of digital-to-analog converters, and further comprising:
   combining the respective outputs of the plurality of digital-to-analog converters; and
   providing the combined output to the one or more electro-optic conversion devices.

6. A service provider system comprising:
   at least one interface component that receives incoming data associated with a plurality of signals to be included in an output downstream data signal;
   at least one signal processing device that maps the respective data for each of the plurality of signals to one or more symbols for the respective signals;
   at least one register that stores the mapped data;
   one or more digital-to-analog converters that read the mapped data from the at least one register and perform a direct radio frequency synthesis on the mapped data; and
   at least one electro-optic conversion component that receives the output of the one or more digital-to-analog converters and performs an electro-optic conversion on the output to generate the output downstream data signal, wherein a size of the at least one register is determined based, at least in part, upon a symbol rate associated with the downstream data signal, a respective number of data bits to be allocated to each symbol, a sample time associated with the electro-optic conversion component, a modulation technique and a bandwidth of the output downstream data.

7. The service provider system of claim 6, wherein the one or more symbols for each signal comprise a plurality of data bits that represent an in-phase portion and a quadrature phase portion of the signal.

8. The service provider system of claim 6, wherein the mapped data is stored in the at least one register in accordance with a sample time associated with the at least one electro-optic conversion component.

9. The service provider system of claim 6, wherein the plurality of signals comprise data associated with at least one of (i) a signal that utilizes amplitude modulation, (ii) a signal that utilizes phase modulation, (iii) a signal that utilizes frequency modulation, or (iv) a signal that utilizes any combination of amplitude, phase, and frequency modulation.

10. The service provider system of claim 6, wherein the one or more digital-to-analog converters comprise a plurality of digital-to-analog converters, and
wherein the respective outputs of the plurality of digital-to-analog converters are combined together.

11. A method comprising:
receiving incoming data associated with a plurality of signals to be included in an output downstream data signal output by a service provider;
mapping the respective data for each of the plurality of signals to one or more respective symbols;
storing the mapped data in at least one data register;
performing a direct radio frequency synthesis on the mapped data;
performing an electro-optic conversion on the synthesized data to generate the output downstream data signal;
identifying a symbol rate associated with the output downstream data signal;
determining a respective number of data bits to be allocated to each symbol;
identifying a sample time associated with the electro-optic conversion; and
determining, based at least in part upon the symbol rate, the sample time, a modulation technique and a bandwidth of the output downstream data signal, a size of the at least one data register, wherein the above operations are performed by one or more computing devices associated with the service provider head end system.

12. The method of claim 11, wherein mapping the data for each of the plurality of signals comprises mapping the data for each signal to a plurality of data bits that represent an in-phase portion and a quadrature phase portion of the signal.

13. The method of claim 11, further comprising:
reading the mapped data from the at least one data register in order to perform the direct radio frequency synthesis.

14. The method of claim 13, wherein storing the mapped data in the at least one data register comprises storing the mapped data in accordance with a sample time associated with the electro-optic conversion.

15. The method of claim 11, wherein receiving incoming data associated with a plurality of signals comprises receiving data associated with at least one of (i) a signal that utilizes amplitude modulation, (ii) a signal that utilizes phase modulation, (iii) a signal that utilizes frequency modulation, or (iv) a signal that utilizes any combination of amplitude, phase, and frequency modulation.

16. The method of claim 11, wherein performing the direct radio frequency synthesis on the mapped data comprises providing the mapped data to one or more digital-to-analog converters to facilitate the direct radio frequency synthesis.

17. The method of claim 16, wherein providing the mapped data to one or more digital-to-analog converters comprises providing the contents to a plurality of digital-to-analog converters, and further comprising:
combining the respective outputs of the plurality of digital-to-analog converters prior to performing the electro-optic conversion.

* * * * *